United States Patent
Enderlin et al.

(10) Patent No.: US 12,160,121 B2
(45) Date of Patent: Dec. 3, 2024

(54) FOREIGN OBJECT DETECTION

(71) Applicant: Delta Electronics (Thailand) Public Co., Ltd., Samutprakarn (TH)

(72) Inventors: Jonas Enderlin, Teningen (DE); Luca König, Wyhl (DE); Ulrich Richter, Freiburg (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 44 days.

(21) Appl. No.: 18/313,392

(22) Filed: May 8, 2023

(65) Prior Publication Data
US 2023/0369900 A1 Nov. 16, 2023

(30) Foreign Application Priority Data
May 10, 2022 (EP) .................... 22172599

(51) Int. Cl.
*H02J 50/60* (2016.01)
*H02J 50/12* (2016.01)

(52) U.S. Cl.
CPC .............. *H02J 50/60* (2016.02); *H02J 50/12* (2016.02)

(58) Field of Classification Search
CPC ................. H02J 50/60; H02J 50/12
USPC ..................................... 307/104
See application file for complete search history.

(56) References Cited

U.S. PATENT DOCUMENTS

| | | | |
|---|---|---|---|
| 10,763,699 B2 * | 9/2020 | Dibben | H02J 50/90 |
| 2020/0235612 A1 * | 7/2020 | Muratov | H02J 50/10 |
| 2020/0350787 A1 * | 11/2020 | Enderlin | H01F 38/14 |
| 2020/0403455 A1 * | 12/2020 | AbuKhalaf | H02J 50/80 |
| 2022/0242257 A1 | 8/2022 | Gotani | |

FOREIGN PATENT DOCUMENTS

| | | |
|---|---|---|
| DE | 202016100925 U1 | 5/2017 |
| EP | 3734801 A1 | 11/2020 |
| WO | 2019219778 A1 | 11/2019 |
| WO | 2021131609 A1 | 7/2021 |

OTHER PUBLICATIONS

The related extended European search report issued on Oct. 31, 2022.

* cited by examiner

*Primary Examiner* — Alfonso Perez Borroto
(74) *Attorney, Agent, or Firm* — CKC & Partners Co., LLC

(57) ABSTRACT

A foreign object detection device for a wireless power transfer system for inductive power transfer from a primary part to a secondary part across an airgap, includes a sensor module with a multitude of detection cells. In order detect a foreign object near a detection cell, a stimulation signal is applied to a detection cell by means of a stimulation unit and the time response of the detection cell is measured with a measurement unit and compared to a reference time response of that detection cell that has been previously sensed by a control and signal processing unit.

20 Claims, 5 Drawing Sheets

FOREIGN OBJECT DETECTION

CROSS-REFERENCE TO RELATED APPLICATION

The disclosure claims priority to European Patent Application No. 22172599.7, filed on May 10, 2022, which is hereby incorporated by reference in its entirety.

TECHNICAL FIELD

The disclosure relates to a foreign object detection device for a wireless power transfer system for inductive power transfer from a primary part to a secondary part across an airgap, where the primary part includes a primary resonator for generating a magnetic field for the inductive power transfer, the foreign object detection device including a sensor module with a current input, a current output, at least one detection cell and a selection unit for connecting one or more of the at least one detection cell to the current input and the current output, where each detection cell includes a sense coil, a stimulation unit connected to the current input for generating a stimulation signal and applying the stimulation signal to the current input, a measurement unit connected to the current input for sensing an electrical signal at the current input, a control and processing unit for triggering the stimulation unit and for processing the electrical signal sensed by the measurement unit to detect a foreign object. The disclosure further relates to a wireless power transfer system including such a foreign object detection device and a corresponding method of foreign object detection in a wireless power transfer system for inductive power transfer.

BACKGROUND

Electrical energy is used in many different applications. To power electrically driven devices, items or objects that are not permanently connected to a source of electrical power, such devices, items or objects are often equipped with one or more batteries that are used to store energy for powering such a device, item or object when it is not connected to a power source. Examples are mobile devices such as cell phones, laptops, cordless screwdrivers and the like, household appliances, automotive vehicles such as cars, lorries, motorbikes, trains, boats, ships, planes, helicopters and the like but also industrial vehicles such as forklifts, AGVs (automated guided vehicles), cleaning machines, elevators and the like or electrically operated equipment for lifting, displacing or transporting goods of any kind. All these devices, items or objects usually include a battery for operating it.

Such batteries may be charged if the energy stored therein has been fully or partially consumed by the device, item or object that is operated therewith. Charging may be done by connecting a source of electrical energy to the battery by wires.

Another way to charge such batteries is wireless charging, usually by inductive power transfer via a magnetic field. Due to the different application, the power classes of such wireless charging systems have a wide spectrum with an output power between 1 W and several 100 kW.

However, one of the problems with wireless charging are objects that are positioned in the magnetic field used for transferring the energy where it is usually not possible to mechanically prevent such objects of being positioned in proximity of the primary and/or secondary unit of the power transfer device. Especially magnetic and conductive objects such as for example coins, keys, tools, cans or other objects, can heat up in a magnetic field quickly by induced eddy currents and hysteresis losses. This unintentional conversion of electrical energy into heat energy causes additional losses and not least a danger for the system and humans or animals being in its environment. Due to physical laws, it is not possible to avoid such effects and the resulting heating. It is therefore important to detect the presence of such foreign objects to counteract the dangers. Such methods are also known as foreign object detection (FOD).

There are already various approaches to solve this problem. In some cases, a curved shape of the transmitting pad ensures that the objects move from the pad with the help of gravity. Another approach is to use sensors to detect the presence of metallic objects. For instance, capacitive sensors and optical sensors can be used, but they can easily be disturbed by environmental influences and non-metallic objects. Inductive sensors are more commonly used, because they are robust against environmental influences such as dirt and provide precise results in the near range at the same time. One kind of inductive sensors detects the reduction of the inductance of a coil due to induced eddy currents in the object to be detected, which counteract the primary field of the coil. With the finite conductivity of the object, also ohmic losses occur, which also may be detected. For the evaluation of these changes, several methods have been established in the state of the art, which are also used in the prior art stated below. It is well known to use arrays of sensor coils in order to increase the detection area while achieving a sufficient detection sensitivity.

Another known technology for FOD includes the measuring of an impedance of a coil, which is arranged in a matrix of several coils and where the impedance of the coil is changed by the presence of a foreign object. For object detection, multiple coils or a single coil is stimulated with a current step. The resulting step response caused by this current step is an oscillation of the voltage. As some of the parameters of that step response such as for example a change in the inductance and/or the resistance of the coil are influenced by a foreign object, a signal analysis of the step response may give a hint to a foreign object placed near that cell.

EP3734801 A1 discloses such a foreign object detection device for a wireless power transfer system. The foreign object detection device includes a sensor module having a multitude of detection cells, where a stimulation signal is applied to a detection cell and where the time response of the detection cell is measured. In order to detect a foreign object, that time response is compared to a previously determined time response of that detection cell at a time when no foreign object had been present. However, the switching of the switches of the primary inverter of the power transfer system results in unwanted interference in the detected time response wherefore complex signal processing techniques or shortening of the signal are necessary to compensate for these varying influences, which results in a loss of information or needs a lot of processing power.

WO2019/219778 A1 discloses another wireless power transfer system for wirelessly transferring power from a power transmitter to a power receiver. In order to enhance foreign object detection, a time division approach is utilized such that the foreign object detection and the power transfer are performed in different time intervals. To do so, the power receiver reduces the power level of the power transfer signal by disconnecting the load during the foreign object detection. This wireless power transfer system has the disadvantage that the transferred power has to be reduced during the foreign object detection wherefore the transmission of a given amount of power takes more time. Accordingly, the charging time of a battery in the power receiver is increased, which is usually not desired.

SUMMARY

It is the object of the disclosure to create a foreign object detection device pertaining to the technical field initially mentioned, that allows to efficiently and reliably detect a foreign object in a wireless power transfer system.

Another object of the disclosure is to create a wireless power transfer system for inductive power transfer that allows to efficiently and reliably detect a foreign object in a wireless power transfer system.

And a further object of the disclosure is to create a method of foreign object detection in a wireless power transfer system for inductive power transfer.

The solution of the disclosure regarding the foreign object detection device is specified by the features of claim 1.

A wireless power transfer system for inductive power transfer typically includes a primary part and a secondary part where the primary part is connected to a power source and the secondary part is included in a device, item or object as described above. Energy from the power source is then transferred from the primary part across an airgap to the secondary part and may be used in the secondary part to either directly power a load or to charge a battery included in the device, item or object for later use. The primary part includes a primary resonator for generating a magnetic field for the inductive power transfer. The secondary part includes a secondary resonator that picks up the magnetic field and converts the energy received through the magnetic field to electrical energy to power a load or to charge a battery. The foreign object detection device for such a wireless power transfer system includes:
- a sensor module with a current input, a current output, at least one detection cell and a selection unit for connecting one or more of the at least one detection cell to the current input and the current output, where each detection cell includes a sense coil,
- a stimulation unit connected to the current input for generating a stimulation signal and applying the stimulation signal to the current input,
- a measurement unit connected to the current input for sensing an electrical signal at the current input, and
- a control and processing unit for triggering the stimulation unit, i.e. to trigger the stimulation unit to generate the stimulation signal and apply the stimulation signal to the current input, and for processing the electrical signal sensed by the measurement unit to detect a foreign object.

According to the disclosure, the foreign object detection device is configured to trigger the stimulation unit to generate the stimulation signal and to apply the stimulation signal to the current input in synchronization with the magnetic field for the inductive power transfer, i.e. with the working frequency of the magnetic field.

Processing of the sensed electrical signal of a particular detection cell for example includes the comparison of the sensed electrical signal of that cell with the previously measured electrical signal of that cell at a time when no foreign object had been present. That previously measured electrical signal when no foreign object had been present is also designated hereinafter as the reference electrical signal and the electrical signal determined during operation of the foreign object detection is also designated hereinafter as the operational electrical signal.

Such a sensed electrical signal is also designated as a time response hereinafter. Accordingly, a previously measured time response when no foreign object had been present is also designated hereinafter as the reference time response and the time response determined during operation of the foreign object detection is also designated hereinafter as the operational time response.

The term "synchronization" in the context of the disclosure preferably means that the stimulation signal is always applied to the current input at the same point in time within a period of the oscillating magnetic field induced by the primary resonator. The stimulation signal may for example always be applied when the magnetic field exceeds a given threshold or falls below a given threshold. This point in the period of the magnetic field is also designated as the trigger point hereinafter.

In this way, the particular point in time to trigger the stimulation signal may for example be determined by correspondingly choosing the level of the threshold that is compared with the sensed magnetic field.

Now, by synchronizing the application of the stimulation signal to the current input with the magnetic field, i.e. with the power transfer field, the processing of the determined time response may be simplified considerably in that it reduces the need for additional processing or shortening of the signal. This is because the stimulation signal is applied to the current input at a particular trigger point to determine the time response of a detection cell during operation, and the stimulation signal is also applied to the current input at the same trigger point to determine the reference time response of that detection cell thereby ensuring that no foreign object is present. Accordingly, the relevant part of the sensed electrical signal to determine whether a foreign object is present or not may simply be determined by subtracting the reference time response from the operational time response of a particular cell, where subtracting two signals from each other is a simple operation that does not require a lot of computing power.

Or in other words, synchronizing the stimulation signal with the magnetic field results in the same or at least generally the same initial conditions every time the measurement unit determines an electrical signal. Or even more simplified, information of the power transfer field phase is used to decrease interferences caused by switching of the inverter in the primary part of the wireless power transfer system that provides the resonator current.

So, foreign object detection according to the disclosure results in a time invariant or even a linear time invariant system (LTI system) which allows to substantially reduce or even eliminate almost the entire interferences.

Hence, a significantly enhanced robustness against the magnetic field can be achieved which also increases the sensitivity of the foreign object detection.

Generally, the term "synchronization" could also be interpreted such that the stimulation signal is applied to the current input at two or more specific, but different trigger points in the period of the magnetic field. For example, the stimulation unit may be triggered when the magnetic field exceeds a given threshold and it may be triggered when the magnetic field falls below that given threshold. This would however not result in a time invariant system and would therefore require much more calculation effort which should be avoided.

Such a foreign object detection device usually includes a sensor module, a stimulation unit, a measuring unit and a control and signal processing unit. The sensor module includes a multitude of detection cells. Each detection cell includes a sense coil and may also include a capacitor to form a resonant circuit. The detection cells are usually arranged in a matrix of rows and columns such that a monitoring of larger areas is possible. Typically, a particular detection cell may be connected to the stimulation unit and to the measurement unit by means of a selection unit that may include an input demultiplexer and also may include an output multiplexer respectively using connecting lines that are fed along the rows and columns of the matrix formed by the detection cells and where the connecting lines are connected to the input and output terminals by controllable switches.

Foreign objects are then detected by applying a stimulation signal provided by the stimulation unit to a selected detection cell, measuring the resulting response with the measuring unit and comparing the resulting response to a response of that detection cell to the same stimulation signal that has previously been recorded ensuring that no foreign object is positioned in the magnetic field. If the resulting response is different from the previously recorded response, it is concluded that a foreign object is present in the magnetic field.

The stimulation signal may for example be a current step. The resulting step response caused by this current step is an oscillation of the voltage. This oscillation may be defined by several parameters, which thus may be influenced by a foreign object. A foreign object may for example change the inductance and/or the resistance of a sense coil.

The stimulation signal may also be a rectangular pulse, a sinusoidal signal or any other signal that allows to determine the property desired or needed for the detection of a foreign object.

In the context of the disclosure, a wireless power transfer system is a system that allows power transfer without wires as a physical link across an air gap by means of a time-varying electromagnetic field. The power transfer system includes a primary part as a transmitter device that generates the electromagnetic field, where the primary part is driven by electric power from a power source. And the power transfer system includes a secondary part as a receiver device, which picks up the electromagnetic field and supplies the power extracted therefrom to an electrical load. In a particular form the wireless power transfer system is an inductive power transfer system, which may for example be used to charge the traction battery of electrical vehicles. Whereas the primary part is usually part of a charging station provided at a fixed place, the secondary part is usually integrated in the electrical vehicle. Such an inductive power transfer system may however also be used to transfer energy to other mobile devices, items or objects as described further above.

The electromagnetic field, which is also referred to as power transfer field, is generated by at least one resonator arranged in the primary part of the power transfer system. The shape of the power transfer field depends on the elements of the resonator and how they are arranged and interconnected. Such a resonator usually includes a resonating circuit with at least one coil and a capacitor. The resonator may also include other elements such as for example an additional inductor and one or more flux guiding elements.

In the context of the disclosure, a foreign object is defined as any electrical conductive and/or a magnetic object, in particular any metallic object that is positioned in proximity to the wireless power transfer system, but which is not part of it and which might induce losses to the power transfer of the power transfer system.

If the stimulation signal is always applied to the detection cells at the same trigger point, the influence of the magnetic field and thus the wireless charging system can be further minimized or at least reduced, in that the operational time response of a particular cell is determined twice, once without application of the stimulation signal and once with the stimulation signal applied. Then the two time responses may be subtracted from each other in order to minimize or at least reduce the influence of the power transfer field thereby extracting as far as possible only that part of the operational time response of a cell that contains the information concerning the response of that cell to the stimulation signal.

This may for example be achieved by determining the time response of a detection cell at the trigger point during a first period without applying the stimulation signal and then applying the stimulation signal and determining the time response of that detection cell at the trigger point during a second period. Then, the time response of the detection cell without stimulation may be subtracted from the time response of that cell with stimulation, thereby reducing or even eliminating the influence of the power transfer field.

So, in an embodiment of the disclosure, the foreign object detection device is configured to control the measurement unit to sense a first electrical signal in synchronization with the magnetic field and to sense a second electrical signal in synchronization with the magnetic field. Both sensings are done within a number N of periods of the magnetic field such that the operating point of the power transfer system has not changed or at least not changed significantly. And the foreign object detection device is configured to avoid triggering of the stimulation unit during the sensing of the first electrical signal and to trigger the stimulation unit during the sensing of the second electrical signal. Accordingly, the control and processing unit is configured to determine the difference between the first and the second electrical signal to eliminate the influence of the power transfer field from the sensed signals. Of course, it is also possible to trigger the stimulation unit during the sensing of the first electrical signal and to avoid triggering of the stimulation unit during the sensing of the second electrical signal and accordingly to determine the difference between the second and the first electrical signal to eliminate the influence of the power transfer field.

In order to ensure accurate measurements, the sensings of the two electrical signals should be done close together in time such that the operating point of the power transfer device does not change between the two sensings or at least not change significantly between the two sensings. So, the number N is for example 20 or lower. In an implementation, the number N is 5 or lower, for example, the number N is one or two. If N is one the foreign object detection device is configured to control the measurement unit to sense the first electrical signal during a first half wave of a period of the magnetic field and to sense the second electrical signal during a second half wave of that period of magnetic field. If N is two the foreign object detection device is configured to control the measurement unit to sense the first electrical signal at the trigger point of a particular period of the magnetic field and to sense the second electrical signal at the same trigger point of the following period of the magnetic field.

Accordingly, in an implementation, the foreign object detection device is configured to determine the reference time response of the detection cells in the same way, i.e. by ensuring that no foreign object is present, then sensing a first reference time response without application of the stimulation signal, sensing a second reference time response with application of the stimulation signal and subtracting the first reference time response and the second reference time response to eliminate the influence of the power transfer field from the reference time response. Again, the both sensings should be done close together in time such that the operating point of the power transfer device does not or at least not significantly change between the sensings.

Synchronization of the stimulation signal with the magnetic field of the power transfer may be achieved in different ways.

One possibility would be that the power transfer system provides a corresponding synchronization signal to the foreign object detection device.

Another option would be to sense the resonator input current, i.e. the current that is fed to the primary resonator to generate the magnetic field. As this current corresponds to the resonator output current, this current is also designated as the resonator current hereinafter. A current transformer with a coil wound around an input or output conductor of the primary resonator and a resistor connected across the coil could for example be used to sense the resonator current and a comparator may be used to compare the sensed resonator current with a threshold.

Although it is easy to compare the resonator current with a given threshold and therefore to generally synchronize the stimulation signal with the magnetic field, it is more difficult to conclude therefrom whether the magnetic field has a given value at a particular point in time, because the magnetic field generated by the primary resonator is not necessarily in phase with the resonator current. In order to detect whether the magnetic field exhibits a given value, further measures would have to be taken.

A third option is to directly sense the magnetic field using a suitable sensor and then synchronize the stimulation signal to the measured magnetic field. To measure a magnetic field either the magnetic field strength or the magnetic flux density may be sensed. This option not only delivers the actual value of the magnetic field but is also easy to implement. So, in an embodiment of the disclosure, the foreign object detection device is configured to trigger the stimulation unit to generate the stimulation signal and to apply the stimulation signal to the current input in synchronization with a magnetic flux density or a magnetic field strength of the magnetic field.

As outlined above, determining the trigger points may be achieved by sensing the magnetic flux density or the magnetic field strength of the magnetic field and comparing the sensed value to a threshold having a given level that results in the desired trigger point within the period of the magnetic field at which the stimulation unit shall be triggered to generate and apply the stimulation signal.

Whereas the trigger point may be any point in the period of the magnetic field, in an implementation, the foreign object detection device is configured to synchronize the stimulation unit with a zero crossing of the flux density or the field strength. Accordingly, in a further embodiment of the disclosure, the foreign object detection device is configured to trigger the stimulation unit to generate the stimulation signal and to apply the stimulation signal to the current input in synchronization with a zero crossing of the magnetic flux density or the magnetic field strength of the magnetic field.

The sensing of the zero crossing of the flux density or the magnetic field strength is rather easy to implement. In order to detect the zero crossing of a signal, the threshold is typically set to zero such that the sensed flux density or the field strength signal is compared to a zero value. And as both the magnetic flux density or the magnetic field strength is a sinusoidal signal, the sensed signal exhibits two zero crossings, namely at the beginning (or the end) of a period and in the middle of the period.

Now, each of these zero crossings may be used as a trigger point, independent of the direction of the zero crossing of the senses signal. Or only those zero crossings of the sensed signal may be used as a trigger point that are caused by a zero crossing in a particular direction. For example, only those zero crossings that occur during the rising of the sensed signal above zero may be used as a trigger point or only those zero crossings that occur during the falling of the sensed signal below zero may be used as a trigger point.

In another embodiment of the disclosure, although the stimulation unit is triggered at the zero crossing of the magnetic flux density or the magnetic field strength, the application of the stimulation signal is slightly delayed such that it is applied to the current input only shortly after the zero crossing of the flux density or the magnetic field strength. This allows to avoid the interference in the sensed electrical signal that are caused by the switching of the switches of the inverter in the primary part of the wireless power transfer system that provides the resonator current for generating the magnetic field. How long the application of the stimulation signal is to be delayed in order avoid these switching edges largely depends on the particular application, particularly on the working frequency and the design of the primary part of the wireless power transfer system. The delay should however be as short as possible but long enough that the transients after the switching operations have subsided.

Generally, it does not matter whether the flux density or the field strength is sensed. Accordingly, the choice may be made in dependency of a particular application. The detector to sense the magnetic field may therefore generally include any suitable sensor such as for example sensors based on the hall effect, the magneto-resistivity effect or the like.

However, as sensing the flux density is easier to implement, the foreign object detection device includes a detector for detecting a crossing of a predetermined threshold by the magnetic flux density of the magnetic field.

As outlined above, it would also be possible that the wireless power transfer system provides the synchronization information directly to the foreign object detection device, for example via a corresponding interface or a direct signal connection. For example, the wireless power transfer system may provide directly those points in time where the resonator current crosses a given threshold or it may provide the corresponding switch control signals to the foreign object detection device which then may derive therefrom the desired trigger points. It would also be possible that the wireless power transfer system senses the magnetic field on its own and then provides the measurement results to the foreign object detection device.

However, it has been found that it is easier to provide the foreign object detection device with a detector to detect the desired trigger points.

Moreover, if the foreign object detection device includes the means to detect the desired trigger points, the foreign object detection device may be used with different wireless power transfer systems as it acquires the necessary information itself. If the synchronization information is provided by the wireless power transfer system, the foreign object detection device depends on being provided with the correct information. Hence, the foreign object detection device may only be used with wireless power transfer systems that are configured accordingly.

In a simple embodiment of the disclosure, the detector includes a coil with one or more windings arranged within the magnetic field, a resistor connected across the coil and a comparator for comparing the resulting voltage across the resistor to a reference voltage. The comparator output is further connected to the control and processing unit that is configured to trigger the stimulation unit based on the comparator output. The reference voltage in this case corresponds to the predetermined current threshold which may be chosen to have any suitable level to determine the desired trigger points.

In an implementation, the coil is arranged within the magnetic field so that the area spanned by the turns of the coil is flown through by the field lines of the magnetic field. Accordingly, in an implementation, the coil is arranged in such a way that the area spanned by the turns of the coil is perpendicular to the field lines.

Such a detector is therefore a simple and cost effective device to determine the trigger points to apply the stimulation signal to the current input of the sensor module.

As outlined above, the foreign object detection device can be configured to trigger the stimulation unit in synchronization with a zero crossing of the magnetic field. In the case of such a detector as described above, the reference voltage to which the comparator output is compared may be 0V.

Whereas the processing of the sensed electrical signals as well as the control of the foreign object detection device may generally also be implemented using analogue technology, in an implementation, the control and processing unit can be configured to process digital signals. This enables a much wider spectrum of operations and options to control and use the foreign object detection device.

Accordingly, in an implementation, the control and processing unit may include a digital processing unit such as a microcontroller, a microprocessor, a digital signal processor, an FPGA (Field Programmable Gate Array), an ASIC (Application Specific Integrated Circuit) or the like. Accordingly, the measurement unit includes an analogue to digital converter for acquiring sampling data representing the sensed electrical signal and where the control and processing unit is configured to determine time response data of the one or more of the at least one detection cell, based on the sampling data acquired by the measurement unit.

As outlined above, interferences within the system may be eliminated or at least reduced by subtracting two time responses of the same detection cell. In the case of digital signal processing and due to the basic characteristics of a linear time invariant system as is the case here, the difference signal of two time responses may simply be determined by sample wise subtraction of the two time responses.

In order to store certain data such as for example the reference time responses or the operational time responses of the detection cells, in an implementation, the control and processing unit may also include a data storage such as for example a memory. Such a memory may either be internal and/or external to the control and processing unit.

The measurement unit may also include a filter for filtering the electrical signal prior to the analogue to digital conversion in order to suppress unwanted parts of the electrical signal. Such a filter may be a band-pass filter or a high-pass filter. The filtering may however also be implemented in the digital part, which means that the control and processing unit may digitally filter the sampling data received from the measurement unit.

The control and processing unit may also apply further processing steps to the sampling data as required such as for example downsampling, upsampling, scaling, data compression, applying correlation functions, parameter identification and the like.

In another embodiment of the disclosure, the control and processing unit is configured to process the sampling data received from the measurement unit by blanking out or masking one or more portions of the sampling data prior to determining the time response data. In an implementation, those portions of the sampling data are blanked out or masked that most likely include interference and would therefore negatively affect the determination of the time response of a particular detection cell and therewith the detection of a foreign object.

It would also be possible, that the whole time response is determined but that those portions of the measured signal including interference are simply ignored or not taken into account during further processing of the signal.

Of course the whole sampling data may be used for further processing if for example the particular application allows a reduced accuracy of the computations.

In an implementation, those portions of the sampling data that are influenced by a switching of the inverter in the primary part of the wireless power transfer system are blanked out or masked to reduce interference.

Or in other words, the interferences caused by the inverter switching may be avoided in that the stimulation signal is applied only after these interferences have faded out or at least reduced to an acceptable level as described further above or they may be avoided in that the corresponding portions of the sensed time response are ignored during processing of the sensed time response by blanking out or masking these portions.

Although there might exist applications where a single detection cell is sufficient to cover the whole area where the power is inductively transmitted from the primary part to the secondary part, to detect foreign objects, in most applications a multitude of detection cells are required to cover that area.

Accordingly, in a further embodiment of the disclosure, the sensor module of the foreign object detection device includes a multitude of detection cells, in which the sense coil of each detection cell includes multiple turns of windings, where each of the windings is spirally wound in a plane, the detection cells are arranged in one or more layers, and the sense coils of a particular layer are arranged in a regular pattern.

In an implementation, the sense coils of the particular layer are arranged in a matrix-like structure with multiple rows and multiple columns.

In an embodiment of the disclosure, where the sensor module includes a multitude of detection cells. In an implementation, the sensor module includes one or more input leads and one or more output leads, where each detection cell is connected between one of the input leads and one of the output leads and where each detection cell is connected to a different combination of input and output leads. In such a foreign object detection device the selection unit includes an input selection circuit configured to selectively establish an electrical connection between the current input and one or more of the input leads, and an output selection circuit configured to selectively establish an electrical connection between one of the one or more output leads and the current output.

In the case of a single input lead the input selection circuit just includes a single connection that connects the current input and the single input lead. In the case of a single output lead the output selection circuit just includes a single connection that connects the single output lead and the current output.

In an embodiment, the sensor module includes an input lead for each of the detection cells and a single output lead. Accordingly, the input selection circuit includes a demultiplexer to selectively establish an electrical connection between the current input and one or more of the input leads and the output selection circuit includes just a single connection that connects the output lead to the current output. Accordingly, by correspondingly controlling the demultiplexer, each of the detection cells may be connected between the current input and the current output.

In another embodiment the sensor module includes multiple input leads and multiple out leads where the input selection circuit includes a demultiplexer to selectively establish an electrical connection between the current input and exactly one of the input leads, and where the output selection circuit includes a multiplexer to selectively establish an electrical connection between exactly one of the output leads and the current output. Accordingly, by correspondingly controlling the multiplexer and the demultiplexer, each of the detection cells may be connected between the current input and the current output.

In both embodiments, a particular detection cell is connected between the current input and the current output, then the stimulation signal is applied to the current input as described above and the measurement unit senses the time response of that detection cell and either stores it for later processing or directly processes is. This process is repeated for each of the detection cells. Finally, based on the data acquired in this way during an initializing phase where the reference time responses of the cells are measured and/or based on the data acquired during operation, the control and processing unit may determine whether a foreign object is present or not.

The solution of the disclosure regarding the wireless power transfer system is specified by the features of claim 13.

According to the disclosure, a wireless power transfer system for inductive power transfer from a primary part to a secondary part across an airgap with the primary part including a primary resonator for generating a magnetic field for the inductive power transfer includes a foreign object detection device as described above.

By including a foreign object detection device into such a wireless power transfer system for inductive power transfer allows to create wireless power transfer system that efficiently and reliably detects foreign objects.

The solution of the disclosure regarding the method of foreign object detection in a wireless power transfer system for inductive power transfer from a primary part to a secondary part across an airgap, where the primary part includes a primary resonator for generating a magnetic field for the inductive power transfer is specified by the features of above descriptions. The method includes:

providing a sensor module with a current input, a current output, at least one detection cell and a selection unit for connecting one or more of the at least one detection cell to the current input and the current output, where each detection cell includes a sense coil, generating a stimulation signal and applying the stimulation signal to the current input, sensing an electrical signal at the current input, detecting a foreign object by processing the sensed electrical signal.

According to the disclosure, the method further includes synchronizing the generation of the stimulation signal and the application of the stimulation signal to the current input with the magnetic field for the inductive power transfer.

In an embodiment of the foreign object detection device at least one detection cell includes a capacitive element, forming a resonant tank together with the sense coil. In an implementation, all detection cells include a capacitive element to form a resonant tank with the sense coil of the cell.

In another embodiment of the foreign object detection device at least one detection cell includes a decoupling element connected in series to its resonant tank. In an implementation, all detection cells include such a decoupling element. Such a decoupling element serves to at least partly restrict a current flow through a detection cell, in at least one direction and for example includes a non-controlled reverse current blocking element. In an implementation, the blocking element is a diode such as for example a PN-junction diode, a PIN-junction diode or a Schottky diode.

Other advantageous embodiments and combinations of features come out from the detailed description below and the entirety of the claims.

BRIEF DESCRIPTION OF DRAWINGS

The drawings used to explain the embodiments show.

In the figures, the same components are given the same reference symbols.

DESCRIPTION OF EMBODIMENTS

Figure 1:
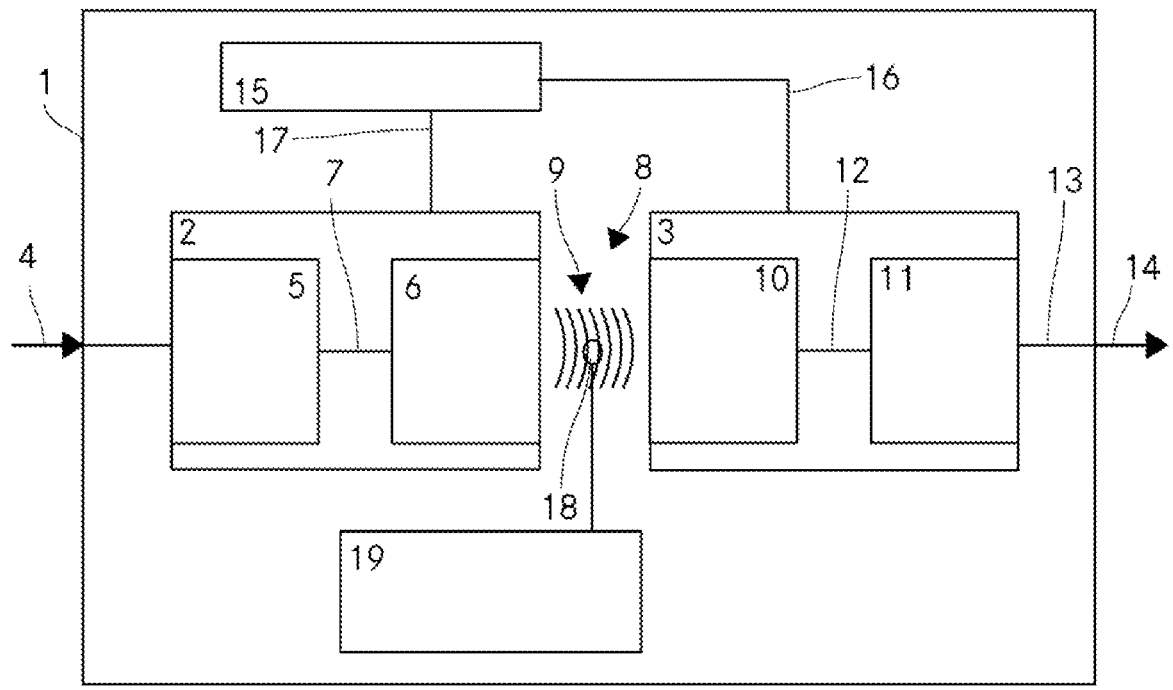
FIG. 1 a schematic representation of a wireless power transfer system according to the disclosure.

FIG. 1 shows a schematic representation of a wireless power transfer system 1 according to the disclosure. The wireless power transfer system 1 includes a primary side 2, a secondary side 3 and a controller 15 which is shown to be separated from the primary side 2 and the secondary side 3. The primary side 2 includes an input stage 5 for converting an input power 4 into an AC (Alternating Current) primary output power 7 which is fed to a primary resonator 6. The primary resonator 6 induces a magnetic field 9 to wirelessly transmit power across an airgap 8. The secondary side 3 includes a secondary resonator 10 which picks up the magnetic field 9 and converts the power received through the magnetic field 9 into an AC secondary output 12. An output stage 11 is connected to the secondary resonator 10 and converts the AC secondary output 12 to a DC (Direct Current) secondary output 13 which is then provided at an output of the wireless power transfer system 1 as an output power 14.

The controller 15 controls the power transfer from the primary side 2 to the secondary side 3 over the airgap 8 such as to meet the requirements of a particular application. The controller 15 controls the primary side 2 for example to meet a certain output power 14 needed by a device connected to the output stage 11. Here, the controller 15 receives some input signal 16 from the secondary side 3 and based on this input signal 16 generates control signals 17 to control the primary side 2 such as to induce a magnetic field 9 to meet the required power at the output of the wireless power transfer system 1. The input signal 16 may for example be a signal representing the power difference between the power outputted by the output stage 11 and the set value for the output power of the output stage 11. The input signal 16 may however also be just a measured value such as for example the actual power, current or voltage at the output stage 11 where the controller 15 therefrom calculates the control signals 17. To do so, the controller 15 also knows the set value for the power, the current or the voltage or the set value is inputted to the controller 15.

The input stage 5 for example includes an AC/AC converter with an AC/DC stage, a DC link and a DC/AC inverter that provides the current for the resonator 6 to generate the magnetic field 9. In such a configuration, the control signals 17 include for example the signals to control the input stage by providing the control signals for switching the switches of the inverter.

Whereas the controller 15 is shown to be a separate unit it may also be integrated into any of the units shown in FIG. 1. It may also be split into two or more controller units to control the primary side 2 and possibly also other functions of the wireless power transfer system 1 or even the function of other devices.

The wireless power transfer system 1 further includes a foreign object detection device 19 to avoid operation of the wireless power transfer system 1 if a foreign object is positioned in the vicinity of the primary resonator 6 and/or the secondary resonator 10 and that could influence the inductive power transfer or even lead to damage of the wireless power transfer system 1 or other objects or persons near the wireless power transfer system 1.

The foreign object detection device 19 includes a sensor 18 to sense the magnetic field 9 generated by the primary resonator 6. The sensor 18 is connected to a detector of the foreign object detection device 19 which determines timing information of the magnetic field 9 based on the output of the sensor 18 in order to enable a synchronization of the sensings of the foreign object detection device 19 with the magnetic field 9.

As can be seen from FIG. 1, the foreign object detection device 19 may be integrated into the wireless power transfer system 1 but it may also be implemented and arranged separately from the wireless power transfer system 1. In such a case, a wireless power transfer system that does not include a foreign object detection device 19 may accordingly be retrofit with such a foreign object detection device 19.

Figure 2:
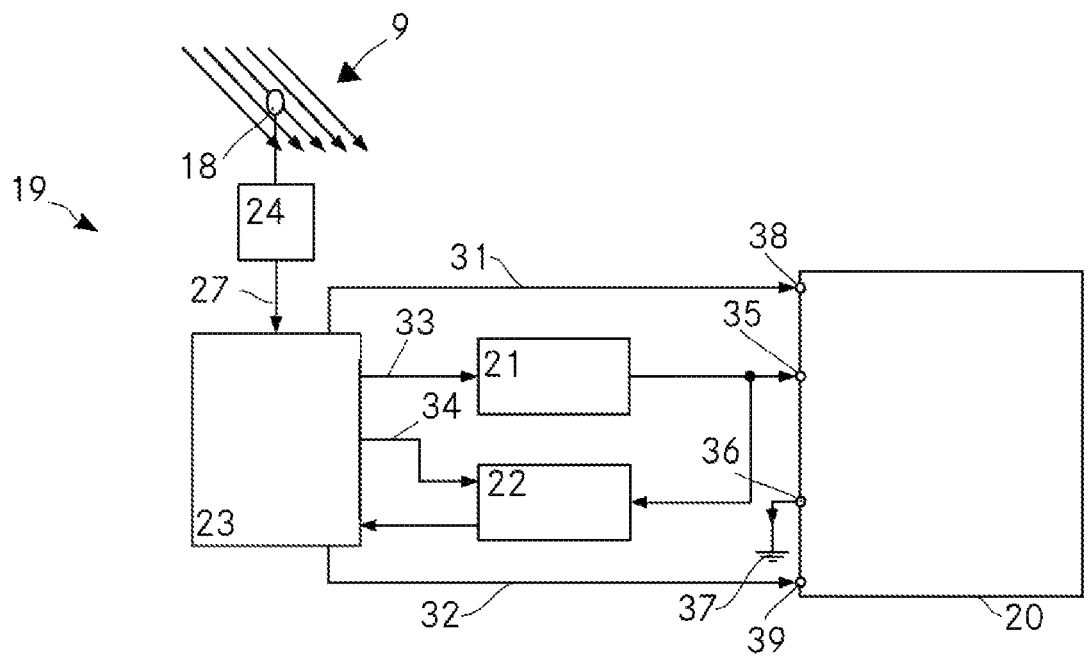
FIG. 2 a more detailed schematic representation of the foreign object detection device as shown in the wireless power transfer system of FIG. 1.

FIG. 2 shows a more detailed schematic representation of the foreign object detection device 19. The foreign object detection device 19 includes a sensor module 20, a stimulation unit 21, a measuring unit 22 and a control and signal processing unit 23. The sensor module 20 for example includes a multitude of detection cells, where each cell includes a resonating circuit with a sense coil and a capacitor, where the detection cells are arranged in a matrix like structure.

The sensor module 20 further includes a current input 35, a current output 36 and control inputs 38, 39. Further, the sensor module 20 includes means to selectively connect each of the detection cells to the current input 35 and the current output 36 in response to the control signals 31, 32 provided by the control and processing unit 23 and applied at the control inputs 38, 39. The current output 36 is connected to ground 37. A detection cell that is connected in this way between the current input 35 and the current output 36 is also designated as an activated detection cell hereinafter.

The stimulation unit 21 is connected to the current input 35. The generation and the application of the stimulation signal by the stimulation unit 21 is controlled by the control and processing unit 23 which provides a corresponding trigger signal 33 to the stimulation unit 21 which then generates a stimulation signal and applies the stimulation signal to the current input 35.

The measurement unit 22 is also connected to the current input 35 to sense a time response signal of the activated detection cell of the sensor module 20 currently connected between the current input 35 and the current output 36 in response to the stimulation signal applied to the current input 35. The stimulation signal is for example a current step and the time response signal detected by the measurement unit 22 is an oscillating voltage signal. A foreign object arranged near the currently activated detection cell influences the parameters of that oscillating voltage signal. A foreign object may for example change the inductance and the resistance of the sense coil of the activated detection cell. Hence, the time response of a particular detection cell with a foreign object near it differs from the time response of that particular detection cell with no foreign object near it. Accordingly, by comparing those two time responses of a particular detection cell, the control and processing unit 23 may detect whether a foreign object is present or not.

Accordingly, the measurement unit 22 is connected to the control and processing unit 23 to provide the detected time responses to the control and processing unit 23 for further processing. The detected time responses may be forwarded as detected or it may be preprocessed. The measurement unit 22 may for example filter the detected time response and it may for example convert the detected time response, which is an analogue signal, to a digital signal.

The time responses of the detection cells with no foreign object near the sensor module 20, the so called reference time responses, are usually sensed in a non-operating mode of the foreign object detection device 19 and stored by the control and processing unit 23 for later use. In order to detect whether a foreign object is present near the sensor module 20 during operation, the time responses of the detection cells are repeatedly determined during operation, compared with the respective stored reference time response of the detection cells to detect whether a foreign object is present or not.

The trigger signal 33 is provided by the control and processing unit 23 to the stimulation unit 21 in dependency of a detection signal 27 provided by the detector 24 to the control and processing unit 23. The detector 24 includes the sensor 18 to sense the magnetic field 9 of the wireless power transfer system 1 and generates detection signals 27 in response to the zero crossings in the sensed magnetic field signal.

The control and processing unit 23 not only controls the stimulation unit 21 but also controls the measurement unit 22. The control and processing unit 23 may for example control the measurement unit 22 to measure the time response signal of an activated detection cell in synchronization with the magnetic field but without the stimulation signal being applied to the current input 35. The measurement of the time response by the measurement unit 22 is for example synchronized with the magnetic field by the control and processing unit 23 based on the detection signal 27 provided by the detector 24.

Figure 3:
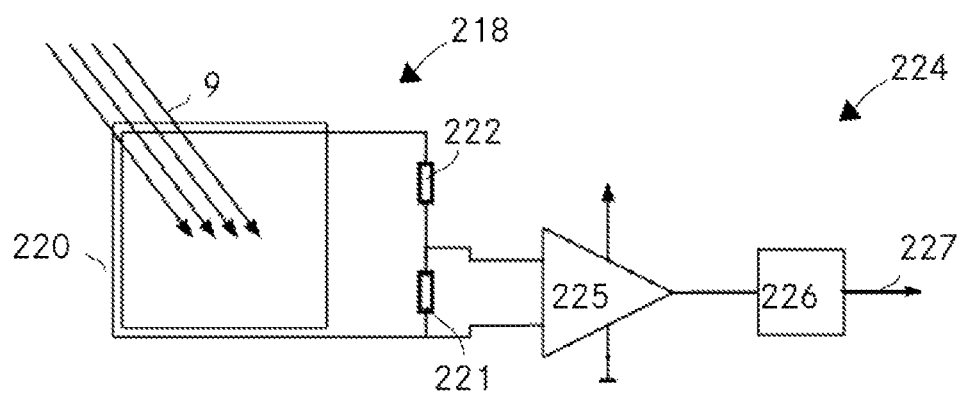
FIG. 3 a schematic representation of a detector for detecting a threshold crossing of the magnetic power field of a wireless power transfer system according to the disclosure.

FIG. 3 shows a schematic representation of a detector 224 for detecting a threshold crossing of the magnetic field 9 of a wireless power transfer system for use in a foreign object detection device according to the disclosure.

The detector 224 includes a coil 220 and two resistors 221, 222 connected in series across the ends of the coil 220. The coil 220 in this example includes two turns, but may also include more or less turns.

The voltage across resistor 221 is tapped and fed to a comparator 225 where the resistors 221, 222 form a voltage divider and are chosen such that the voltage across the resistor 221 has the correct level for the comparator 225. The comparator output is then fed as the detection signal 227 to the control and processing unit of a foreign object detection device according to the disclosure. In this case, however, the comparator output first is filtered by a bandpass filter 226 to eliminate unwanted frequencies.

As the voltage across the resistor 221 is directly fed to the comparison inputs of the comparator 225, the comparator detects a zero voltage across the resistor 221. And since a zero voltage across the resistor 221 only occurs if the magnetic flux density flowing through the coil 220 is zero, the detection signal 227 identifies the zero crossing of the magnetic field 9. Accordingly, the detector 224 may also be designated as a phase detector for the detection of the phase of the magnetic field.

In another example, the voltage at the common terminal of the two resistors 221, 222 relative to a base voltage may be fed to one of the comparison inputs of the comparator 225 and a reference voltage relative to that base voltage may be fed to the other comparison input of the comparator 225 such as to compare the voltage at the common terminal of the two resistors 221, 222 with the reference voltage. The base voltage may for example be grounding voltage. In this way, it is not the zero crossings of the sensed magnetic flux density that is detected by the detector 224 but it's the crossing of a threshold that corresponds to the reference voltage that is detected by the detector 224.

Figure 4:
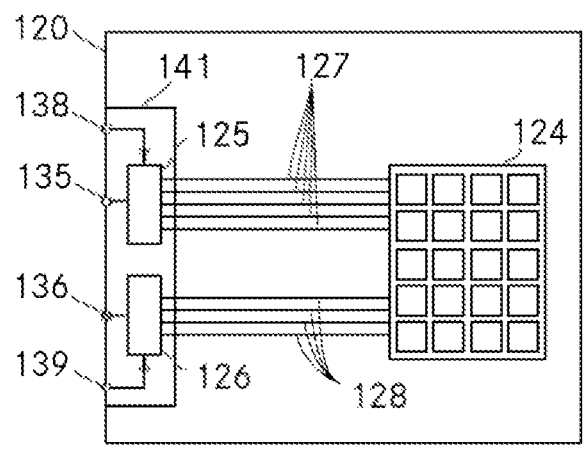
FIG. 4 a schematic representation of a sensor module for a foreign object detection device according to the disclosure.

FIG. 4 shows a schematic representation of a sensor module 120 for a foreign object detection device according to the disclosure. The sensor module 120 includes an array of detection cells included in a sense coil mat 124, a selection unit 141, a current input 135, a current output 136 and two control inputs 138, 139. In the example shown in FIG. 4, the array includes 20 detection cells arranged in four columns and five rows.

The selection unit 141 includes a demultiplexer 125 that is connected with the sense coil mat 124 by means of five input leads 127 and the selection unit 141 includes a multiplexer 126 that is connected with the sense coil mat 124 by means of four output leads 128. The demultiplexer 125 is configured to connect one of the input leads 127 to the current input 135 in response to a control signal applied to the control input 138 and the multiplexer 126 is configured to connect one of the output leads 128 to the current output 136 in response to a control signal applied to the control input 139. Each of the input leads 127 is connected with each of the detection cells of the sense coil mat 124 in a particular row and each of the output leads 128 is connected with each of the detection cells of the sense coil mat 124 in a particular column. Accordingly, each of the detection cells of the sense coil mat 124 may be individually selected and connected between the current input 135 and the current output 136 by means of the selection unit 141 controlled by proper control signals applied to the control inputs 138, 139.

For the detection of foreign objects in a wireless power transfer system, the sense coil mat 124 is positioned in the air gap across which the power is wirelessly transferred from the primary part to the secondary part.

Figure 5:
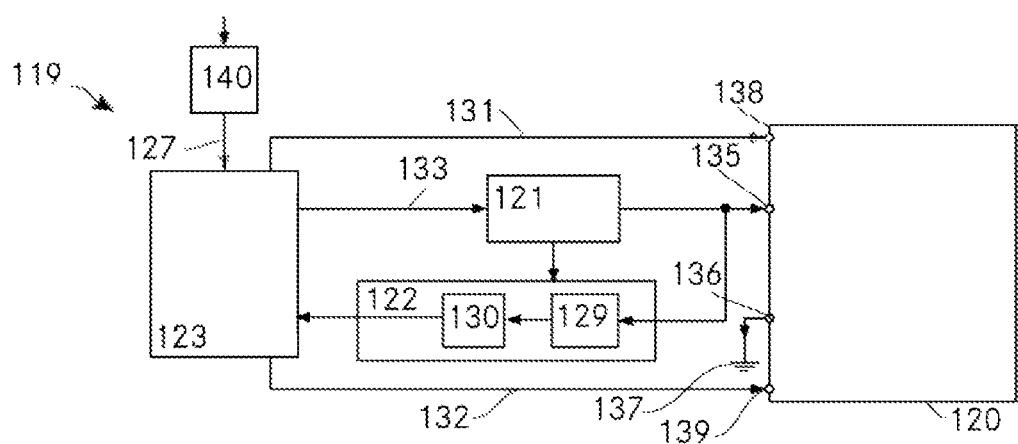
FIG. 5 a more detailed schematic representation of a foreign object detection device according to the disclosure.

FIG. 5 shows a more detailed schematic representation of a foreign object detection device 119 according to the disclosure.

The foreign object detection device 119 includes a sensor module 120 such as for example the sensor module 120 shown in FIG. 4 but it may also include another sensor module having for example more or less detection cells or the same number of detection cells differently arranged. The foreign object detection device 119 further includes a stimulation unit 121, a measuring unit 122 and a control and processing unit 123. The control and processing unit 123 provides the control signals 131, 132 to the sensor module 120 to activate the desired detection cell.

The output of the stimulation unit 121 is connected to the current input 135. The measuring unit 122 includes a bandpass filter 129 and an Analogue-to-Digital Converter (ADC) 130 connected to an output of the bandpass filter 129. And the input of the bandpass filter 129 is connected to the current input 135. The output of the Analogue-to-Digital Converter 130 is connected to the control and processing unit 123. Accordingly, the measuring unit 122 senses the voltage at the current input 135, bandpass filters it with the bandpass filter 129, converts it to a digital signal with the Analogue-to-Digital Converter 130 and provides that digital signal to the control and processing unit 123. So, each digital signal provided to the control and processing unit 123 represents a time response of a particular detection cell in response to the application of the stimulation signal to the current input 135 by the stimulation unit 121.

The pass-band of the bandpass filter 129 includes the resonant frequencies of the resonant tanks of the detection cells of the sensor module, here having a frequency of about 900 kHz. The stop bands eliminate frequencies related to the operating frequency of the power transfer field, which is here for example 45 kHz.

The band-pass filter 129 is optional and also may be replaced by a high pass-filter. In addition or instead of the bandpass filter 129, the measurement unit 122 may also include a signal conditioning module, for instance in order to scale the signal or convert the signal.

The foreign object detection device 119 further includes a detector 140 for detecting the zero crossing of the magnetic field 9 and providing a corresponding detection signal 127 to the control and processing unit 123.

Based on the detection signal 127, the control and processing unit 123 determines a trigger point and provides a corresponding trigger signal 133 to the stimulation unit 121 which then generates a stimulation signal and applies the stimulation signal to the current input 135.

The measuring unit 122 may also sense the voltage at the current input 135 without a stimulation signal being applied to the current input 135. In this way it is for example possible to measure the behavior of the detection cells in response to the external interference alone.

This allows to eliminate the influence of the interference in the detection of foreign objects by the foreign object detection device 119. The control and processing unit 123 controls the sensor module 120 to activate a particular detection cell. Then, on receipt of a detection signal 127 of the detector 140, it determines a trigger point based on the received detection signal 127 and then controls the measuring unit 122 to sense a time response of the activated detection cell at the determined trigger point but without triggering the stimulation unit 121 to generate and apply the stimulation signal to the current input 135. The trigger point may for example be the zero crossing of the magnetic field 9. The sensed time response is then filtered by the bandpass filter 129, converted by the Analogue-to-Digital Converter 130 and provided to the control and processing unit 123 which stores the corresponding sampling data.

Then, within the same period of the magnetic field, or at least within a few periods of the magnetic field such that the operating point of the wireless power transfer system has not changed, the control and processing unit 123 controls the sensor module 120 to activate the same particular detection cell, determines the same trigger point on receipt of a detection signal 127, triggers the stimulation unit 121 by means of the trigger signal 133 to generate and apply the stimulation signal to the current input 135 and controls the measuring unit 122 to sense the time response of the activated detection cell at the determined trigger point. Again, the sensed time response is then filtered by the bandpass filter 129, converted by the Analogue-to-Digital Converter 130 and provided to the control and processing unit 123 which stores the corresponding sampling data or directly processes it.

By sample wise subtraction of the sampling data representing these two time responses, the influence of the interference present in the system is eliminated and a pure time response of that detection cell to the stimulation signal remains.

By analyzing this pure time response the detection of foreign objects is much more reliable with a reduced computational effort due to the synchronization of the measurements to the magnetic field, i.e. by using the same trigger point within a period of the magnetic field for the measurements.

Further, as outlined above, a reference time response of that particular detection cell without a foreign object has been sensed previously, filtered by the bandpass filter 129, A/D converted by the Analogue-to-Digital Converter 130 and the corresponding sampling data has been stored. Also, this acquisition and storing of the reference time response of the particular detection cell may be made twice, once without the stimulation signal being applied and once with the stimulation signal being applied. But both sensings are done at the same trigger point determined by the control and processing unit 123 based on the detection signal 127 that denotes the zero crossing of the magnetic field. Then, the difference of both signals is stored as a pure reference time response of that detection cell.

Accordingly, the sampling data of the pure time response of that particular detection cell during operation is compared to the previously stored sampling data of the pure reference time response of that particular detection cell to receive the response of that detection cell to the stimulation signal alone.

In order to detect the presence of a foreign object, the control and processing unit 123 is configured to calculate a parameter related to the series impedance of a selected detection cell, based on the time response and the reference time response of a detection cell, or, as outlined above, based on the pure time response and the pure reference time response of a detection cell.

The control and processing unit 123 includes for example a microcontroller, e.g. a digital signal controller or a digital signal processor, an FPGA and/or an ASIC. The control and processing unit 123 further includes a storage for storing the sampled data provided by the Analogue-to-Digital Converter 130. It may also be configured to reconstruct the stimulation signal, as for instance a storage for the time stamps of the trigger events of the stimulation signals. Alternatively, the measurement unit 122 may include another signal channel for the acquisition of the stimulation signal. The control and processing unit 123 then also includes a data storage for the acquired samples of the stimulation signal.

Figure 6:
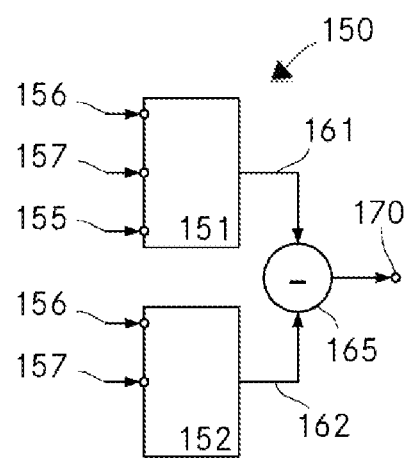
FIG. 6 a conceptual representation of interference reduction in the measured signals.

FIG. 6 shows a conceptual representation of interference reduction in the measured signals. As outlined above, one advantage of the synchronization of the stimulation signal with the magnetic field is the possibility to transfer the analysis of the measured time responses from a time variant to a time invariant system. In this case, it may even be transferred to a linear time invariant system. The synchronization of the stimulation and therewith also the measurement of the time responses of the detection cells with the magnetic field allows to eliminate or at least substantially reduce those portions of the time responses caused by interference of the power magnetic field. FIG. 6 shows the resulting LTI system 150. A first stimulation and measurement 151 and a second stimulation and measurement 152 are carried out where both of them are synchronized to the magnetic field, i.e. carried out at the same trigger point. Accordingly, the first and the second measured time responses 161, 162 of both stimulation and measurement 151, 152 include portions caused by the power field 157 itself and portions caused by the switching noise 156 induced by the switches of the inverter to generate the AC input signal for the resonator on the primary side of the wireless power transfer system.

The first stimulation and measurement 151 is carried out with stimulation 155, i. e. with the stimulation signal being applied to the activated detection cell. Accordingly, the first measured time response 161 also includes the response of the activated detection cell to the stimulation signal. The second stimulation and measurement 152 however, is carried out without stimulation. Accordingly, the second measured time response 162 does not include the response of the activated detection cell to the stimulation signal but just the response to the switching noise 156 and the power field 157.

Both stimulation and measurement 151, 152 may however also include other portions caused by other interference or the like.

Now, in order to eliminate the interference caused by the switching noise 156 and the power field 157, the second measured time response 162 is subtracted from the first measured time response 161 by means of a subtractor 165. Accordingly, in the resulting time response those portions in the measured time responses caused by the switching noise 156 and the power field 157 are eliminated. Due to the characteristics of such an LTI system 150, the resulting time response 170 therefore mainly includes the response of the activated detection cell to the stimulation signal.

Figure 7A:
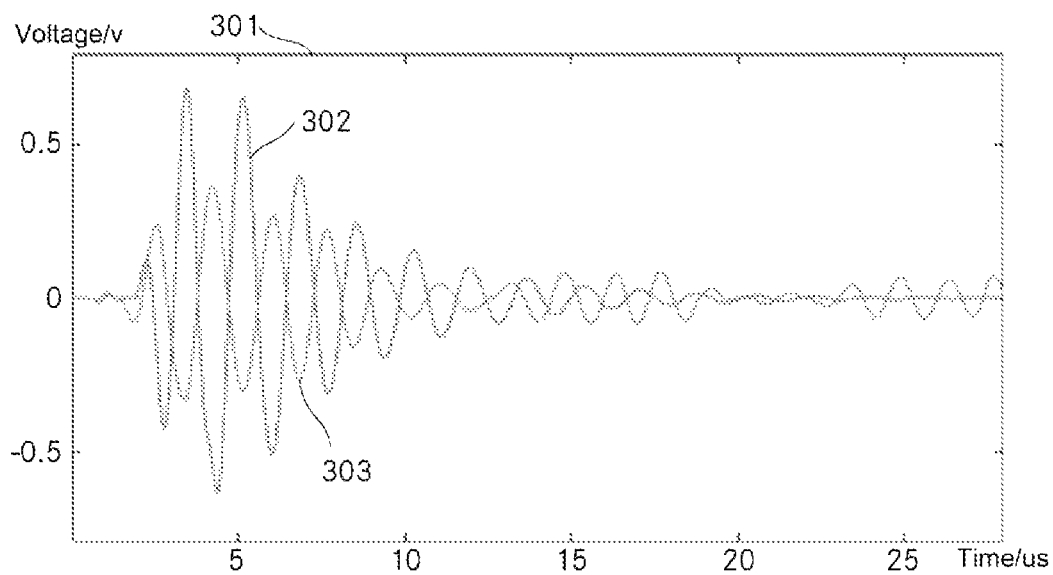
FIG. 7a measurement results of a time response without synchronization.
Figure 7B:
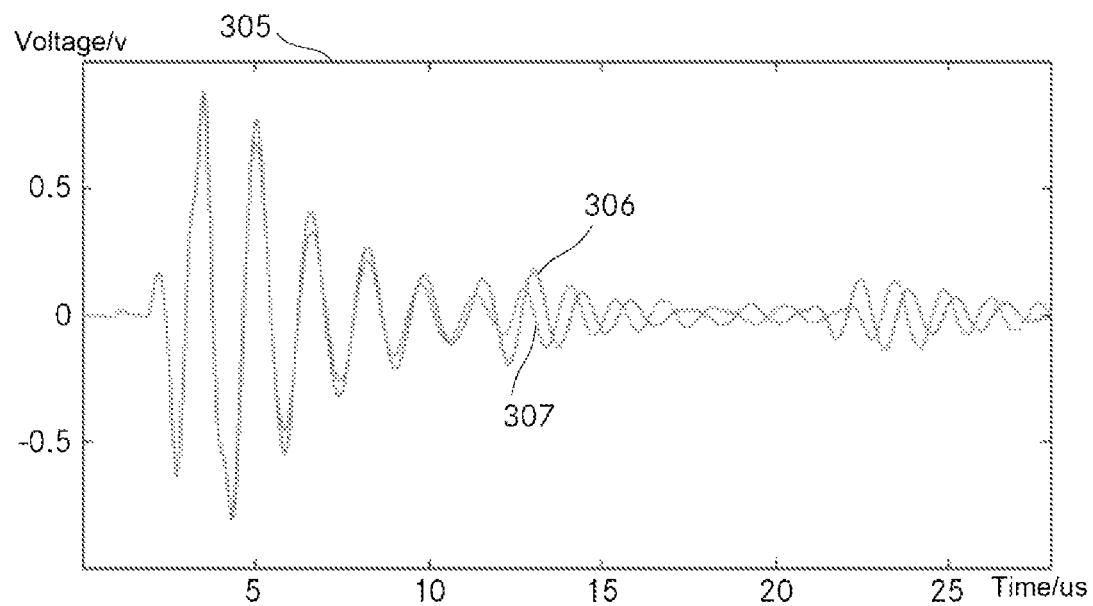
FIG. 7b measurement results of a time response with synchronization.

FIG. 7*a* and FIG. 7*b* shows measurement results of a time response without and with synchronization of the stimulation signal and the measurements with the magnetic field. The stimulation signal in both cases is a current step applied at the current input.

The diagram 301 illustrated in FIG. 7*a* shows the measurement result of a time response of a detection cell to the current step at the current input without synchronization of the current step to the magnetic field. And the diagram 305 illustrated in FIG. 7*b* shows the measurement result of a time response of another detection cell to a current step at the current input with synchronization of the current step to the magnetic field. The horizontal axes of the two diagrams show the time in microseconds and the vertical axes show the measured voltage in volts.

Signal 302 shows the step response of a detection cell without the magnetic field for the power transfer being activated. Accordingly, signal 302 shows the step response of that detection cell to the current step alone, i.e. without interference of the magnetic power transfer field. And signal 303 shows the step response of the same detection cell in operation of the wireless power transfer system, i.e. with the magnetic field for the power transfer being activated but without synchronization of the current step to the magnetic field.

As can be seen in FIG. 7*a*, the signal 303 is phase-shifted by approx. 180° with respect to signal 302, i.e. completely out of phase. This is due to fact that the application of the stimulation signal is not synchronized with the magnetic field. Or in other words, the current step may occur at any time during the period of the magnetic field. In this example, the current step has occurred at about 180° into the period of the magnetic field.

In order to compensate for this phase-shift, complex and elaborate calculations were necessary. Moreover, the phase-shift between the magnetic field and the application of the current step is unpredictable because it is different for each detected time response, which makes these compensating computations even more complicated.

Now turning to diagram 305. Signal 306 again shows the step response of a detection cell without the magnetic field for the power transfer being activated. And signal 307 shows the step response of the same detection cell in operation of the wireless power transfer system, i. e. with the magnetic field for the power transfer being activated. In contrast to diagram 301, the current step applied to the current input is however in synchronization with the magnetic field. Accordingly, the current step does not occur at a random point of the period of the magnetic field but is timed such as to occur at a zero-crossing of the magnetic field.

As is easy to see in FIG. 7*b* that the signal 307 is in phase with the signal 306 thanks to the synchronization of the current step with the zero crossing of the magnetic field. And it can be seen as well that, apart from a slight attenuation of the amplitude from approx. 5 microseconds on, signal 307 is almost identical with signal 306 up to about 11 microseconds.

Hence, no complex and elaborate calculations are necessary to further process this signal 307. Signal 307 may for example easily be further processed by subtracting it from signal 306, resulting in a differential signal that is almost zero until up to about 11 microseconds. This differential signal may then easily be compared to a previously stored reference signal or pure reference signal to determine whether a foreign object has been present near that detection cell when the measurement has been done.

Figure 8:
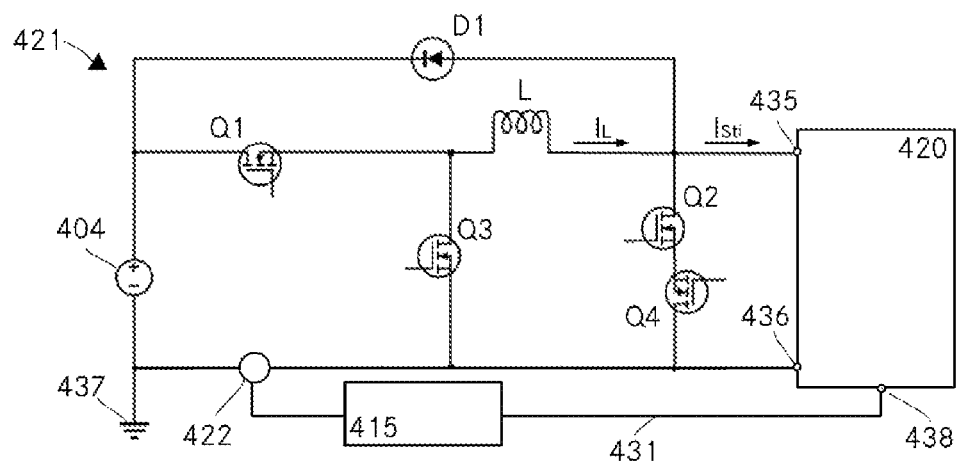
FIG. 8 a schematic representation of a stimulation circuit for a foreign object detection device according to the disclosure and FIG. 9 a timing diagram of the synchronization of the stimulation signal.

FIG. 8 shows a schematic representation of a stimulation circuit 421 for a foreign object detection device according to the disclosure. The stimulation circuit 421 includes a power source 404 that provides a DC voltage to generate the stimulation signal. An inductor L is connected to the positive terminal of the power source 404 via a first switch Q1 and the other terminal of the inductor L is connected to the current input 435 of a sensor module 420. Although the sensor module 420 is shown to be a part of the stimulation circuit 421, this is usually not the case. The current output of the sensor module 420 is connected to the negative terminal of the power source 404 and to ground 437. A third switch Q3 is connected from the common terminal of the first switch Q1 and the inductor L to ground. And a serial circuit of second switch Q2 and a fourth switch Q4 is connected between the current input 435 and the current output 436. As the time response is an oscillating signal, two antiserially connected switches Q2 and Q4 are used. This avoids any current flow from the current input 435 to the current output 436 or from the current output 436 to the current input 435. If only a single MOSFET switch would be used, such a current flow could occur through the body diode of that MOSFET switch.

A diode D1 is connected across the serial circuit formed by the first switch Q1 and the inductor L where the anode of the diode D1 is connected to current input 435 and the cathode of the diode D1 is connected to the positive terminal of the power source 404. The diode D1 serves to recover the energy stored in the inductor L and return it back to the power source 404.

Not shown in FIG. 8 are the switches of the sensor array 420, i.e. the switches of the selection circuit to activate a particular detection cell of the sensor array and connect it to the current input 435 and the current output 436.

A controller 415 controls the sensor module 420 through control input 438 to activate a particular detection cell of the sensor module 420 by correspondingly controlling the switches of the selection circuit. And the controller 415 also controls the switching of the switches Q1-Q4 which in this case are MOSFET switches. The control of a switch Q1-Q4 is usually done by a suitable gate driver that applies the corresponding control signal to the gate of the switch Q1-Q4 and the gate driver is controlled by the controller 415. Neither the gate drivers nor the control lines from the controller 415 to the gate drivers or the gates of the switches Q1-Q4 respectively are shown in FIG. 8.

Although the controller 415 is shown to be a part of the stimulation circuit 421 in this example, the controller 415 that controls the stimulation circuit is usually a part of the foreign object detection device as the controller 415 is not only used to control the stimulation circuit 421 but also to control other functions of the foreign object detection device.

The stimulation circuit 421 further includes a measurement device 422 to sense the current $I_L$ through the inductance flowing back to the negative terminal of the power source 404. The measurement device 422 for example includes a resistor and the current $I_L$ is measured by measuring the voltage across the resistor.

Figure 9:
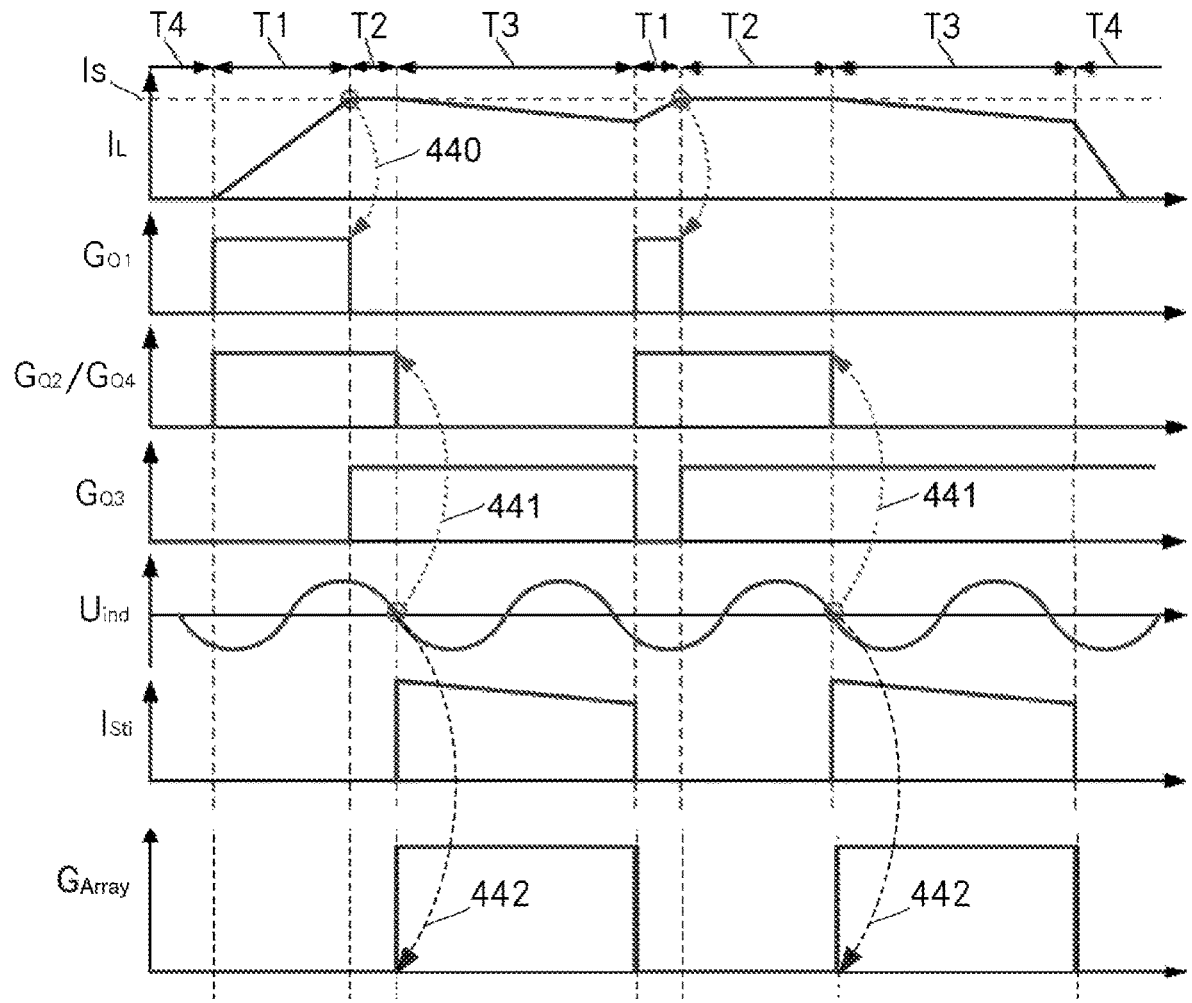

The function of the stimulation circuit 421 is shown in FIG. 9 by means of a timing diagram of two consecutive stimulation and measuring cycles. FIG. 9 shows a number of rows. The first row shows the current $I_L$ through the inductance L, the second row shows the control signal $G_{Q1}$ at the gate of the first switch Q1, the third row shows the control signal $G_{Q2}/G_{Q4}$ at the gate of the second and fourth switch Q2, Q4, the fourth row shows the control signal $G_{Q3}$ at the gate of the third switch Q3, the fifth row shows the voltage $U_{ind}$ that represents the course of the magnetic field and that is detected by a detector as described further above, and the sixth row shows the generated stimulation current $I_{Sti}$ that is applied to the current input 435 to excite the activated detection cell of the sensor module 420. And the seventh row shows the control signal $G_{Array}$ at the gate of the switch or the switches of the selection circuit to activate the detection cell that is to be stimulated at a given time.

The horizontal axis of each of these rows represents time.

As outlined further above, in order to synchronize the stimulation and measurement of the stimulation circuit 421 with the oscillating magnetic field for the power transfer, the magnetic field is sensed, the induced current is converted to an AC voltage and the zero crossings of that voltage are detected by a comparator. Row five shows this induced voltage $U_{ind}$. The zero crossings of the voltage $U_{ind}$ are detected and the resulting detection signal is then fed to a controller to control the generation of the stimulation signal. In this case, the detection signal is fed to the controller 415.

In FIG. 9, the stimulation circuit 421 is in its idle mode, which is shown as the time interval T4 at the left side of FIG. 9 and in which all switches Q1-Q4 are switched OFF. Then, the first stimulation and measuring cycle starts at the end of the time interval T4. The first switch Q1 and the second and fourth switches Q2, Q4 are switched ON by the controller 415. As a result, the current $I_L$ through the first switch and the inductance L starts to increase and flows through switches Q2, Q4 back to the power source 404. This switching ON of the switches Q1, Q2, Q4 is usually not in synchronization with the magnetic field.

As soon as the sensed current $I_L$ reaches a threshold, in this case a threshold current $I_S$, the controller 415 switches OFF the first switch Q1 which is shown by the arrow 440. At the same time the controller 415 switches ON the third switch Q3. Accordingly, the current $I_L$ commutates from the first switch Q1 to the third switch Q3 and continues to flow through the inductance L. The time interval T1 designates the time from the switching ON of the first switch Q1 until the current $I_L$ reaches the threshold current $I_S$.

Then, the controller 415 waits for the next zero crossing of the induced voltage $U_{ind}$ and as soon as that zero crossing is detected, the controller 415 switches OFF the second and the fourth switch Q2, Q4 which is shown by the arrow 441. At the same time, the controller 415 activates the desired detection cell of the sensor module 420 by means of the control signal 431 provided to the control input 438 of the sensor module 420, which is shown by the arrows 442. Particularly, the controller 415 switches ON those switches of the selection circuit that connect the detection cell that is to be activated at this time, to the current input 435 and the current output 436. The seventh row shows the gate signal $G_{Array}$ that switches the corresponding switches ON to activate the desired cell. In the example shown in FIG. 9, the first detection cell is activated in the first time interval T3 and the second detection cell is activated in the second time interval T3. The time interval T2 designates the time from the switching OFF of the first switch Q1 until the next zero crossing when the switches Q2, Q4 are switched OFF. As can be seen, the detected zero crossings are those during the falling of the induced voltage $U_{ind}$.

The current $I_L$ therefore stops flowing through switches Q2, Q4 but flows through the activated detection cell of the sensor module 420 as the stimulation current $I_{Sti}$ which is shown in row 6. The stimulation signal for the excitation of the activated detection cell is that stimulation current $I_{Sti}$ that enters the sensor module 420 at the current input 435 and leaves the sensor module 420 at the current output 436.

The third switch Q3 remains ON for a time interval T3 and is then switched OFF by the controller 415. As can be seen, the time interval T3 in this example is a bit longer than a period of the induced voltage $U_{ind}$ but may however be chosen to be longer such as for example a bit longer than two or three periods of the induced voltage $U_{ind}$. However, as the stimulation current $I_{Sti}$ slightly decreases over time, it makes no sense to choose a time interval T3 that is substantially longer than three or four periods of the induced voltage Ulna. The length of the time interval T3 may also depend on whether further detection cells are to be stimulated afterwards or whether the system goes into idle mode.

As can be seen in FIG. 9, the second stimulation and measuring cycle starts at the end of the first time interval T3 by switching ON the first, the second and the fourth switch Q1, Q2, Q4. As can be seen, the current $I_L$ has not decreased to zero during the preceding time interval T3, wherefore it takes less time for the current $I_L$ to reach the threshold current $I_S$. Hence, the time interval T1 in this second stimulation and measuring cycle is shorter than in the first cycle. As soon as $I_L$ has reached the threshold current $I_S$, the first switch Q1 is switched OFF and the third switch Q3 is switched ON.

At the next zero crossing, the switches Q2, Q4 are switched OFF as shown by arrow 441 and the desired detection cell is activated as shown by the arrow 442 which applies the stimulation current $I_{Sti}$ to the desired detection cell and which starts the next time interval T3. Again, switch Q3 is switched OFF at the end of the time interval T3 which terminates the stimulation current $I_{Sti}$ and therewith the second stimulation and measuring cycle. In this example, there is no further detection cell that is to be stimulated and the system goes into idle mode during which is again shown as the time interval T4 and during which the switches Q1, Q2 and Q4 are switched OFF. Switch Q3 is shown to remain ON, which allows a current to flow through the inductor L and the diode D1 back into the power source 404 thereby reducing the magnetic field in the inductor L and recovering the energy stored in the inductor L. Switch Q3 may be switched OFF later once the energy stored in the inductor L is fully recovered. Also, in the idle mode of the stimulation circuit 421, all detection cells of the sensor module 420 are deactivated. So, the stimulation circuit 421 is ready for the next one, two or more stimulation and measuring cycles.

Of course the devices and components shown in the drawings may include further elements that are not shown in the drawings. The functions of the foreign object detection device described in the specification can be realized by a circuit, which includes a subcircuit or a combination of a plurality of subcircuits, that is, the units (e.g., the stimulation unit, the measurement unit, and the control and processing unit) described in the specification can be implemented as a subcircuit or a combination of a plurality of subcircuits.

In summary, it is to be noted that a foreign object detection device according to the disclosure allows an efficient and reliable detection of foreign objects in a wireless power transfer system, i.e. with a reduced effort to analyze the detected time responses of the detection cells by synchronizing the application of the stimulation signal and the measurement of the corresponding time responses with the magnetic field of the wireless power transfer system. In this way, the analysis of the time responses of the detection cells is converted from a time variant system to a time invariant system which allows to substantially simplify the analysis of the measured signals and makes the detection of foreign objects more reliable.

What is claimed is:

1. A foreign object detection device for a wireless power transfer system for inductive power transfer from a primary part to a secondary part across an airgap, wherein the primary part comprises a primary resonator for generating a magnetic field for the inductive power transfer, the foreign object detection device comprising:
    a sensor module with a current input, a current output, at least one detection cell and a selection unit for connecting one or more of the at least one detection cell to the current input and the current output, wherein each detection cell comprises a sense coil,
    a stimulation unit connected to the current input for generating a stimulation signal and applying the stimulation signal to the current input,
    a measurement unit connected to the current input for sensing an electrical signal at the current input,
    a control and processing unit for triggering the stimulation unit and for processing the electrical signal sensed by the measurement unit to detect a foreign object,
    wherein the foreign object detection device is configured to trigger the stimulation unit to generate the stimulation signal and to apply the stimulation signal to the current input in synchronization with the magnetic field for the inductive power transfer.

2. The foreign object detection device according to claim 1, wherein the measurement unit is configured to sense a first electrical signal in synchronization with the magnetic field and to sense a second electrical signal in synchronization with the magnetic field within a number N of periods of the magnetic field, and the stimulation unit is configured to avoid being triggered during sensing of the first electrical signal and to be triggered during sensing of the second electrical signal, and wherein the control and processing unit is configured to determine a difference between the first and the second electrical signal, and the measurement unit is configured to sense the first electrical signal during a first half wave of a period of the magnetic field and to sense the second electrical signal during a second half wave of that period of the magnetic field.

3. The foreign object detection device according to claim 1, wherein the stimulation unit is configured to generate the stimulation signal and to apply the stimulation signal to the current input in synchronization with a magnetic flux density or a magnetic field strength of the magnetic field.

4. The foreign object detection device according to claim 3, wherein the stimulation unit is configured to generate the stimulation signal and to apply the stimulation signal to the current input in synchronization with a zero crossing of the magnetic flux density or the magnetic field strength.

5. The foreign object detection device according to claim 3, further comprising a detector for detecting a crossing of a predetermined current threshold by the magnetic flux density of the magnetic field.

6. The foreign object detection device according to claim 5, wherein the detector comprises a coil with one or more windings arranged within the magnetic field, a resistor connected across the coil and a comparator for comparing a voltage across the resistor to a reference voltage, wherein a comparator output is connected to the control and processing unit that is configured to trigger the stimulation unit based on the comparator output and wherein the reference voltage corresponds to the predetermined current threshold.

7. The foreign object detection device according to claim 6, wherein the reference voltage is 0V.

8. The foreign object detection device according to claim 1, wherein the measurement unit comprises an analogue to digital converter for acquiring sampling data representing the sensed electrical signal and wherein the control and processing unit is configured to determine time response data of the one or more of the at least one detection cell, based on the sampling data acquired by the measurement unit.

9. The foreign object detection device according to claim 8, wherein the control and processing unit is configured to blank out or mask one or more portions of the sampling data prior to determining the time response data.

10. The foreign object detection device according to claim 9, wherein the control and processing unit is configured to blank out or mask those portions of the sampling data that are influenced by a switching of an inverter for generating a resonator current.

11. The foreign object detection device according to claim 1, wherein the sensor module comprises a multitude of detection cells, a sense coil of each detection cell comprises multiple turns of windings, and each of the windings is spirally wound in a plane, and wherein the detection cells are arranged in one or more layers, and the sense coils of a particular layer are arranged in a regular pattern.

12. The foreign object detection device according to claim 11, wherein the sensor module comprises one or more input leads and one or more output leads, and each detection cell is connected between one of the input leads and one of the output leads, and wherein each of the multitude of detection cells is connected to a different combination of input and output leads, and wherein the selection unit comprises an input selection circuit configured to selectively establish an electrical connection between the current input and one or more of the input leads, and an output selection circuit configured to selectively establish an electrical connection between one of the one or more output leads and the current output.

13. A wireless power transfer system for inductive power transfer from a primary part to a secondary part across an airgap, wherein the primary part comprises a primary resonator for generating a magnetic field for the inductive power transfer, wherein the wireless power transfer system comprises the foreign object detection device according to claim 1.

14. A method of foreign object detection in a wireless power transfer system for inductive power transfer from a primary part to a secondary part across an airgap, wherein the primary part comprises a primary resonator for generating a magnetic field for the inductive power transfer, the method comprises:
    providing a sensor module, a stimulation unit, a measurement unit, and a control and processing unit, wherein the sensor module comprises a current input, a current output, at least one detection cell and a selection unit for connecting one or more of the at least one detection cell to the current input and the current output
    generating a stimulation signal and applying the stimulation signal to the current input in synchronization with the magnetic field for the inductive power transfer by the stimulation unit,
    sensing an electrical signal at the current input in synchronization with the magnetic field for the inductive power transfer by the measurement unit, and
    detecting a foreign object by processing the sensed electrical signal by the control and processing unit.

15. The method according to claim 14, wherein the sensing of the electrical signal at the current input further comprises:
sensing a first electrical signal at the current input in which the stimulation signal is not applied,
sensing a second electrical signal at the current input in which the stimulation signal is applied, and
wherein the detecting of the foreign object by processing the sensed electrical signal further comprises determining a difference between the first electrical signal and the second electrical signal.

16. The method according to claim 15, wherein the sensing of the first electrical signal at the current input is performed during a first half wave of a period of the magnetic field and the sensing of the second electrical signal at the current input is performed during a second half wave of the period of the magnetic field, or the sensing of the first electrical signal at the current input is performed at a trigger point of a first period of the magnetic field and the sensing of the second electrical signal at the current input is performed at the same trigger point of a second period following to the first period of the magnetic field.

17. The method according to claim 15, wherein the detecting of the foreign object by processing the sensed electrical signal further comprises comparing the difference between the first electrical signal and the second electrical signal with a reference electrical signal for detection of the foreign object.

18. The method according to claim 14, wherein the generating of the stimulation signal is in synchronization with a zero crossing of a magnetic flux density or a magnetic field strength of the magnetic field.

19. The method according to claim 18, further comprises:
providing a detector comprising a coil with one or more windings arranged within the magnetic field, a resistor connected across the coil and a comparator for comparing a voltage across the resistor to a reference voltage for detecting the zero crossing.

20. The method according to claim 14, wherein the sensing of the electrical signal by the measurement unit further comprises:
providing an analog to digital converter for acquiring sampling data representing the sensed electrical signal, and
wherein the processing of the sensed electrical signal by the control and processing unit further comprises:
pre-processing the sampling data by blanking out or masking one or more portions of the sampling data; and
determining time response data based on the pre-processed sampling data.

* * * * *